Dec. 7, 1954 — R. N. KIRCHER — 2,696,411
COMBINED ANTIFRICTION AND PLAIN BEARING FOR AXIAL AND RADIAL LOADS
Filed July 29, 1950

INVENTOR.
RALPH N. KIRCHER
BY John W. Michael
ATTORNEY

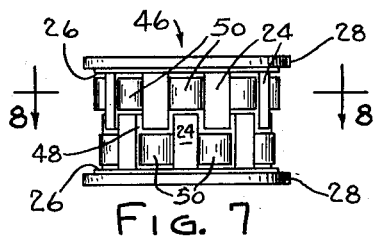
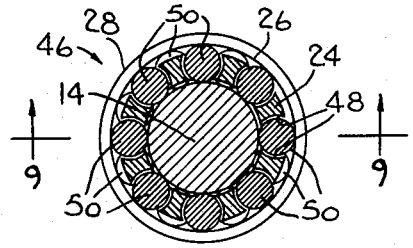
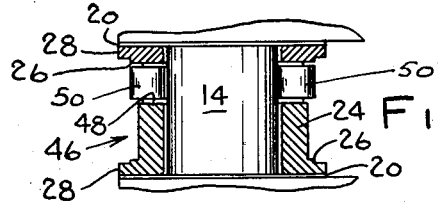
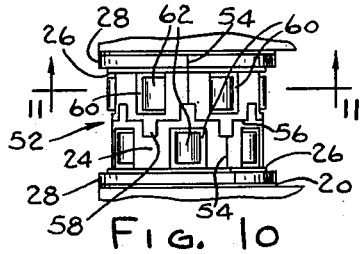
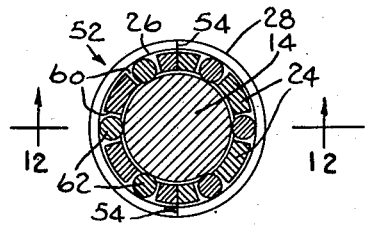
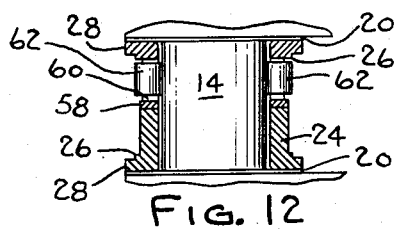

2,696,411
Patented Dec. 7, 1954

2,696,411

COMBINED ANTIFRICTION AND PLAIN BEARING FOR AXIAL AND RADIAL LOADS

Ralph N. Kircher, West Bend, Wis., assignor to West Bend Aluminum Co., West Bend, Wis., a corporation of Wisconsin Application July 29, 1950, Serial No. 176,719

11 Claims. (Cl. 308—35)

This invention relates to improvements in bearings and particularly to combined anti-friction and plain bearings capable of carrying both axial and radial loads.

Bearings of this type have advantageous use in the engines of outboard motors or other engines having vertical crank shafts. In such engines there is a heavy radial load which is best carried by an anti-friction bearing. However, there must be provision for absorbing the axial thrust brought about by the force of gravity.

It is an object of this invention, therefore, to provide a combined anti-friction and plain bearing which takes both radial and axial thrust with a minimum of frictional loss or generated heat.

In obtaining this object use is made of a cage which has a cylindrical body and an annular flange. If the radial thrust is the principal factor, the cylindrical body has openings in which are guided anti-friction elements such as rollers or balls, and the flange provides a plain bearing for the axial thrust. If the axial thrust is the principal factor, the flange has openings in which are guided such anti-friction elements and the cylindrical body provides the plain journal bearing for the radial thrust. In either event, that part of the cage which provides the plain bearing should be bronze or other relatively soft bearing material.

The novel features which are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 7 is a view in side elevation of a bearing embodying a third modification of the invention with the outer relatively movable element removed;

Fig. 8 is a sectional view taken on line 8—8 of Fig. 7;

Fig. 9 is a sectional view taken on line 9—9 of Fig. 8;

Fig. 10 is a fragmentary view in side elevation of a bearing embodying a fourth modification of the invention with the outer relatively movable element removed;

Fig. 11 is a sectional view taken on line 11—11 of Fig. 10;

Fig. 12 is a sectional view taken on line 12—12 of Fig. 11;

Fig. 13 is a plan view of a bearing embodying a fifth modification of the invention with the outer relatively movable element removed;

Fig. 14 is a sectional view taken on line 14—14 of Fig. 13; and

Fig. 15 is a sectional view taken on line 15—15 of Fig. 14.

Figure 1:
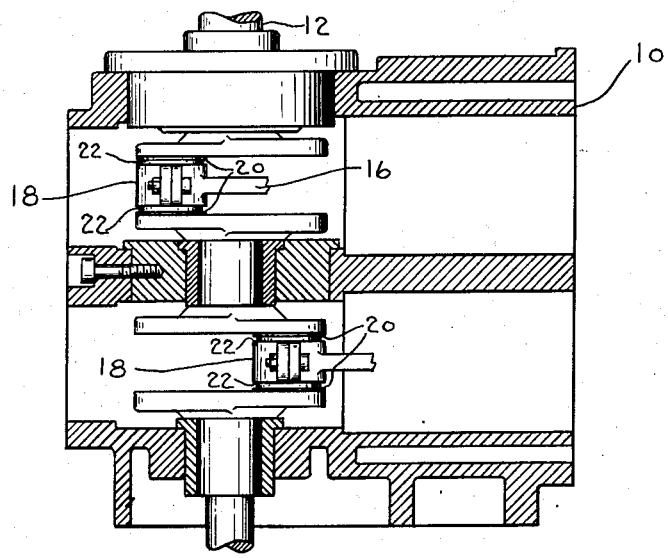
Fig. 1 is a sectional view of an engine cylinder block having a vertical crank shaft with connecting rod bearings embodying the present invention.

The five modifications of the invention disclosed herein have as a common feature a bearing cage with a cylindrical body between the radially opposed relatively moving surfaces and an annular flange between the axially opposed relatively moving surfaces. In the majority of uses the cylindrical body will have openings which receive and guide anti-friction elements such as rollers or balls to carry the radial load and the annular flange will be in sliding engagement with the axially opposed surfaces. In all cases that part of the cage which provides the plain bearing is made of bronze or other relatively soft bearing material so that it prevents the destruction of relatively harder materials of the opposed relatively moving interconnected elements. The bearings hereinafter described are shown in use between the cranks 14 on a vertical crank shaft 12 and the ends 18 of connecting rods 16. The crank shaft 12 is mounted in a cylinder block 10 in the usual manner. The cranks 14 have flat surface cheeks 20 which are axially opposed to the flat lateral surfaces 22 on the sides of the rod ends 18. The outer cylindrical surfaces of the cranks are radially opposed to the inner cylindrical surfaces on the crank ends. As it is difficult under present commercial practices to harden the surfaces 20, such surfaces would be easily destroyed if placed in direct bearing contact with the surfaces 22 on the rod ends 18. Hence the bearings hereinafter described were shown in an application where their thrust-receiving characteristics could be used to good advantage.

While each bearing of the various modifications will be identified by different reference numerals the parts of each bearing cage which are the same in each modification will be identified by the same reference numerals. Each cage has a cylindrical body 24, the inner cylindrical surface of which has a diameter greater than the diameter of the outer cylindrical surface of the crank 14 or other shaft to which the bearing is applied. The body 24 has an annular ridge 26 adjacent each end which is engaged by the inner surface of the rod ends 18 to space such surface from the outer surface of the body 24. At each end of the body 24 there are annular flanges 28 which project laterally of the body (or radially of the cage) so as to lie between the axially opposed relatively moving surfaces. The spacing of the body 24 from the radially oppositely relatively moving surfaces is essential only when radial loading is the principal factor as this permits the anti-friction elements guided under such circumstances by the body to be in rolling contact with such opposed surfaces. If the axial load were the principal factor the ridges 26 could be omitted so that the body 24 would be in sliding contact with such opposed surfaces.

Figure 2:
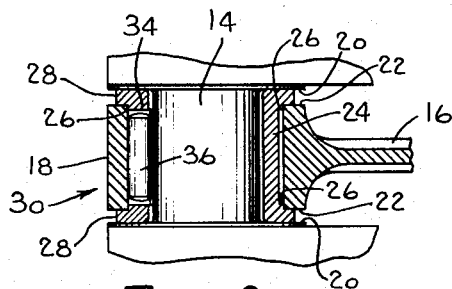
Fig. 2 is an enlarged fragmentary sectional view taken through the vertical axis of a crank and connecting rod and showing a bearing embodying a first modification of the invention.
Figure 3:
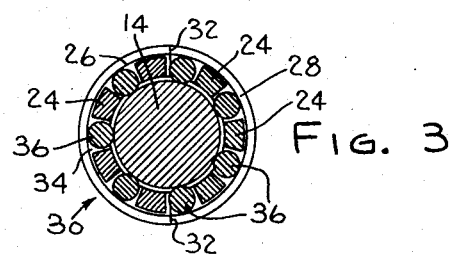
Fig. 3 is a sectional view taken on line 3—3 of Fig. 4.
Figure 4:
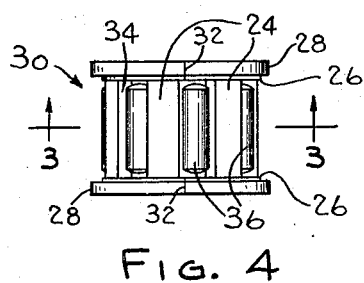
Fig. 4 is a view in side elevation of such bearing disassociated from said crank and connecting rod for simplicity in illustration.

The cage of bearing 30 shown in Figs. 2 to 4, inclusive, is separated into two sections along line 32 movable radially to effect installation on the crank. The body 24 of this bearing has a plurality of rectangular openings 34 which extend axially between the ridges 26. Rollers 36 guided in said openings project diametrically beyond the body 24 to be in rolling contact with the crank 14 and connecting rod end 18. The openings 34 have radially extending sides and rollers 36 are loosely inserted from the outside. To assemble the bearing 30 two sections of the cage are radially fitted together about the crank 14 and the rollers 36 embedded in their respective openings 34 in a layer of grease stiff enough to hold the rollers and sections in place while the cap of the connecting rod 16 is secured in the customary manner.

Figure 5:
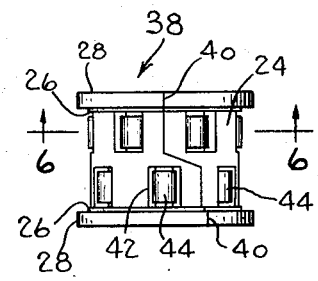
Fig. 5 is a view in side elevation of a bearing embodying a second modification of the invention with the outer relatively movable element removed.
Figure 6:
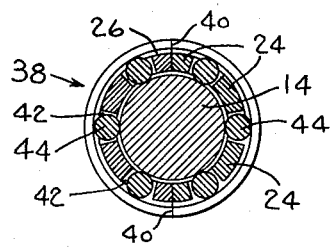
Fig. 6 is a sectional view taken on line 6—6 of Fig. 5.

The cage of bearing 38 shown in Figs. 5 and 6 is separated along the meandering line 40 and has two sections which are movable radially to effect the installation of the cage on the crank. The body 24 of this bearing has a plurality of rectangular openings 42 which extend axially between the ridges 26 and the central part of such body. The openings on one side of the central part are angularly staggered with respect to those on the other side of such part. Rollers 44 guided in said openings project diametrically beyond the body 24 to be in rolling contact with the crank 14 and the connecting rod end 18. The rollers of this bearing are considerably shorter than those of the bearing 30 with the resulting advantage of lessening the tendency of the rollers to cock with respect to the axis of rotation.

The cage of bearing 46 shown in Figs. 7 to 9, inclusive, is separated into two sections which are movable axially to effect the installation thereof on a shaft which is open-ended. The body 24 of this bearing consists of angularly spaced axial projections the sides of which are cylindrically concave to form rectangular openings 48 therebetween. Rollers 50 are inserted axially into such openings and are retained against lateral displacement by such concave sides. The sections are fitted together by shifting them relatively angularly so that the projections of one section fit into the openings 48 of the other section. They thus hold the rollers 50 in each opening against axial displacement. An advantage of this bearing is that the rollers are held in place during assembly without the necessity of using a stiff retaining grease. To assemble the bearing 46 one section is first fitted axially over the shaft and the rollers axially inserted in the openings 48 of such section. The other section with the rollers inserted in their respective openings is then fitted axially on the shaft and moved into interlocking place with the first section. Unless the sections of this bearing are separable axially it would not be mechanically feasible to produce the openings 48 with cylindrically concave sides.

The cage of bearing 52, shown in Figs. 10, 11, and 12, is split into four sections along two axial lines 54 and the transverse line 56. The sections of this cage may be both axially and radially separated thus making it usable on either closed end or open end shafts. The sections may have axial projections and conforming recesses, indicated at 58, to provide an interlock preventing angular displacement between the sections. The body 24 of this bearing has rectangular openings 60 positioned and designed like those of the bearing 38. Rollers 62, similar to the rollers 44 of the bearing 38, are guided in the openings 60 in the same manner as bearing 38.

The cage of bearing 64 shown in Figs. 13, 14, and 15 is separated into two sections along line 66 and are movable radially to effect installation of such bearing on a shaft. The body 24 of this bearing has a plurality of cylindrical openings 68 spaced as shown. These openings receive and guide steel balls 70 which project diametrically beyond the body 24 to be in rolling contact with the crank 14 and the connecting rod end 18. It is preferable to pean over or slightly inwardly deform the edges of the openings 68 at both ends thereof, as indicated at 72, while the balls 70 are in place. Such deformed edges will hold the balls 70 in place without affecting the free rolling movement thereof within the openings.

Although only several embodiments of the invention are shown and described herein, it will be understood that this application is intended to cover such other changes or modifications as come within the spirit of the invention or scope of the following claims.

I claim:
1. A combined thrust and radial bearing for relatively moving elements having radially opposed cylindrical surfaces and axially opposed flat surfaces, comprising a cage having a cylindrical body adapted to be positioned between said radially opposed cylindrical surfaces and an annular flange integral with said body adjacent either end thereof and adapted to be positioned between and in sliding engagement with said axially opposed flat surfaces, said body having a plurality of axially extending slots therein the longitudinal confines of which are spaced inwardly of said flanges, and anti-friction elements guided in said slots and in pressure contact with said cylindrical surfaces, the circumferential dimension of said slots at the outer face of said cage being greater than the diameter of the anti-friction elements to permit radial insertion of said elements in said slots.

2. A bearing as claimed in claim 1 in which said cage is split in two sections separable radially from each other.

3. A bearing as claimed in claim 1, in which said cage is split into two sections separable axially from each other.

4. A bearing as claimed in claim 1 in which said cage is split into four sections separable both radially and axially.

5. A bearing as claimed in claim 4 in which said sections have interlocking portions.

6. A bearing as claimed in claim 1 in which the material of said cage is of less thickness than the diameter of said anti-friction elements and said slots are rectangular and extend substantially across said body between said flanges and said anti-friction elements consist of rollers, and wherein an annular shoulder is provided on the inner faces of the respective flanges, the diameter of which is greater than the external diameter of the cylindrical body portion of said cage to thereby define an annular space between the outer cylindrical surface of the cage and the cylindrical surface opposed thereto when in use, to accommodate the portions of the anti-friction rollers which protrude from said slots.

7. A bearing as claimed in claim 1 in which said slots are rectangular and of less length than half the length of said body and are positioned on opposite sides of the longitudinal center of said body.

8. A bearing as claimed in claim 7 in which the slots on one side are angularly staggered with respect to those on the other side of said center and said elements consist of relatively short rollers.

9. A bearing as claimed in claim 1 in which said slots are circular and said elements consist of balls.

10. A bearing as claimed in claim 9 in which the edges of said slots are formed inwardly to hold said balls therein.

11. A combined thrust and radial bearing for relatively moving elements having radially opposed surfaces and axially opposed surfaces, comprising a cage having a cylindrical body between said radially opposed surfaces and an annular flange integral with said body between and in sliding engagement with said axially opposed surfaces, said cage consisting of axially separable sections, the body of each section comprising spaced projections with concave cylindrical sides forming openings therebetween, the projection of one section fitting within the openings of the other section when assembled, and anti-friction rollers rotatable in said opening and restrained from lateral displacement by said sides.

References Cited in the file of this patent

UNITED STATES PATENTS

| Number | Name | Date |
|---|---|---|
| 1,117,970 | Bugatti | Nov. 24, 1914 |
| 2,053,534 | Robinson | Sept. 8, 1936 |
| 2,094,251 | Young | Sept. 28, 1937 |
| 2,198,376 | Cederberg | Apr. 23, 1940 |
| 2,373,860 | Torresen | Apr. 17, 1945 |
| 2,374,443 | McClung | Apr. 24, 1945 |